United States Patent [19]
Wygasch et al.

[11] 3,755,110
[45] Aug. 28, 1973

[54] PROCESS FOR THE RECOVERY OF MERCURY FROM THE BRINE FILTER SLUDGE OBTAINED IN THE ELECTROLYSIS OF ALKALI METAL CHLORIDES BY THE AMALGAM PROCESS

[75] Inventors: Ewald Wygasch, Ludwigshafen; Guenther Weiss, Wachenheim, both of Germany

[73] Assignee: Badische Anillin & Soda-Fabrik Aktiengesellschaft, Ludwigshafen/Rhein, Germany

[22] Filed: Mar. 15, 1971

[21] Appl. No.: 124,170

[30] Foreign Application Priority Data
Mar. 18, 1970 Germany............... P 20 12 754.2

[52] U.S. Cl. ............................... 204/99, 204/150
[51] Int. Cl. ........................... C01d 1/16, B01k 3/00
[58] Field of Search ............................ 204/99, 150

[56] References Cited
UNITED STATES PATENTS
3,647,359  3/1972  Bell.................................. 204/99 X
3,536,597  10/1970  Yamori et al........................ 204/99

FOREIGN PATENTS OR APPLICATIONS
45/14,667   5/1970  Japan................................. 204/99
1,207,772  10/1970  Great Britain....................... 204/99

Primary Examiner—John H. Mack
Assistant Examiner—D. R. Valentine
Attorney—Johnston, Root, O'Keeffe, Keil, Thompson & Shurtleff

[57] ABSTRACT

Process for the recovery of mercury from the brine filter sludge of alkali-chlorine cells.

The brine filter sludge is treated with solutions containing active chlorine for the extraction of mercury or its compounds. Insoluble impurities are filtered off, and the resulting mercuric filtrate is passed to the electrolytic cell where the dissolved mercury is reduced to metal at the cathode under the operating conditions of the cell.

Metallic mercury may also be recovered from the filtrate with the aid of sodium amalgam.

6 Claims, 1 Drawing Figure

Patented Aug. 28, 1973
3,755,110
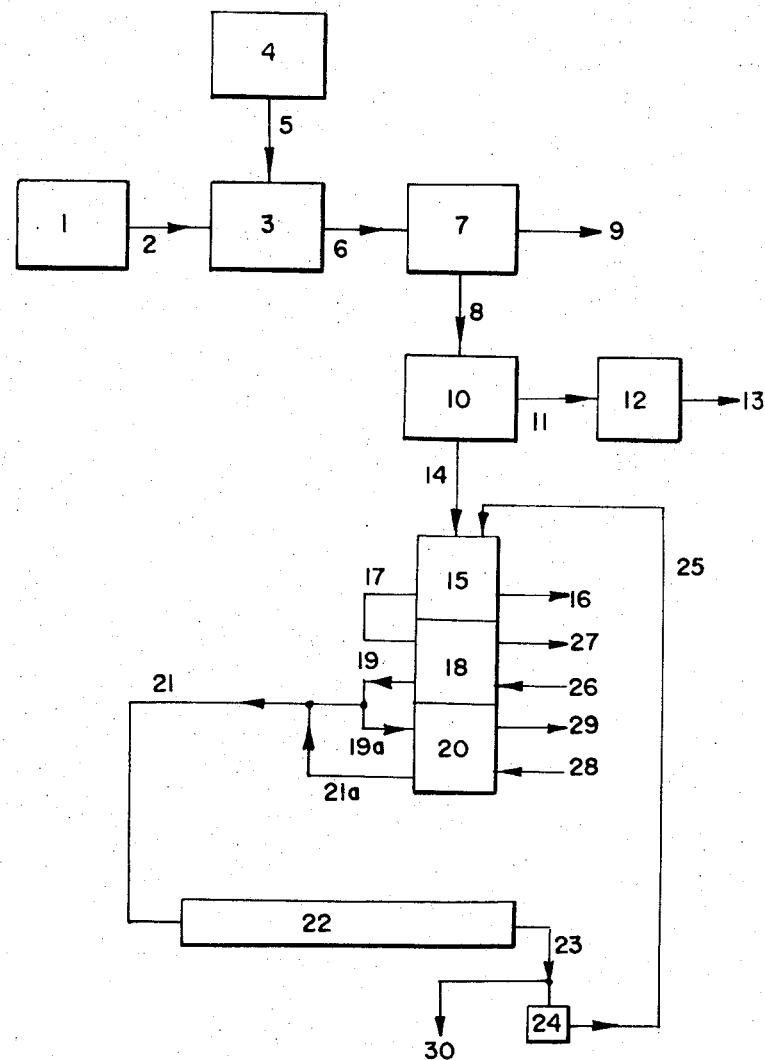
INVENTORS:
EWALD WYGASCH
GUENTHER WEISS
BY: Johnston, Root, O'Keeffe, Keil, Thompson & Shurtleff
ATT'YS

PROCESS FOR THE RECOVERY OF MERCURY FROM THE BRINE FILTER SLUDGE OBTAINED IN THE ELECTROLYSIS OF ALKALI METAL CHLORIDES BY THE AMALGAM PROCESS

This invention relates to a process for the recovery of mercury from the brine filter sludge of an alkali-chlorine electrolytic cell having a cathode of mercury or amalgam.

In the electrolysis of alkali metal chlorides by the amalgam process, a chlorine-saturated brine low in alkali metal chlorine leaves the cell. This brine is dechlorinated with alkali metal chloride and then, if necessary, chemically treated to remove residual chlorine, after which it is resaturated with alkali metal chloride, purified and recycled to the cell.

The chlorine-saturated brine leaving the cell contains a certain amount of mercury, mainly in the form of mercuric chloride. The amount of mercury leaving the cell in this manner is governed by the conditions of operation and also by the construction of the cell. It is usually between 1.5 and about 15 mg/l of impoverished brine. However, mercury concentrations of up to 200 mg/l may occur over short periods, for example when the cells are switched off for overhauling or when the current supply fails, in which cases the no longer polarized mercury cathode is exposed to attack by the supernatant chlorine-saturated brine until the latter is displaced by fresh pure brine.

Depending on the method used for working up the brine, a relatively large amount of mercury remains in the brine filter sludge and is thus lost. In the various chemical processes used for removing the residual chlorine from the brine with alkali metal sulfides or alkali hydrogen sulfides, only a slight excess of sulfide ions is sufficient to precipitate the mercury virtually quantitatively in the form of mercury sulfide. In the amalgam process only a fraction of the salt contained in the almost saturated pure brine is electrolytically decomposed (in general from 10 to 25% of the salt contained in the brine feed) and it is thus necessary to circulate large amounts of brine; consequently, the amount of mercury swept out with the impoverished, chlorine-saturated brine represent a considerable portion of mercury losses in the amalgam process.

The precipitated mercury sulfide may be separated from the impoverished brine by filtration and brine filter sludge is thus obtained containing from 2 to 10% of mercury calculated as metal. The main constituent of this sludge is fine graphite entrained by the brine. It is from this brine filter sludge that mercury is recovered.

Swiss Pat. No. 420,073 reveals a method of extracting the mercury sulfide from the brine filter sludge obtained in the amalgam process for the electrolysis of alkali metal chlorides by means of sodium sulfide or sodium polysulfide and of recovering metallic mercury from the extract by means of sodium amalgam.

It is also known from French Pat. No. 1,541,426 to treat the brine filter sludge with acids such as concentrated sulfuric acid and to absorb the thus dissolved mercury in an ion exchanger, the adsorbed material then being eluted and the eluate electrolyzed for the recovery of mercury.

The equipment required for carrying out these known processes on an industrial scale is, however, costly, and accurate control of the individual steps of these processes is necessary.

We have now found a particularly simple and economical method of recovering mercury from the brine filter sludge obtained in plants for the electrolysis of alkali metal chlorides by the amalgam process, which method comprises the brine filter sludge with solutions containing active chlorine, filtering off the undissolved portion of the filter sludge, washing, combining the filtrate and washings and precipitating the mercury from the resulting mercuric solution.

In order to recover the mercury in its metallic state from the resulting solution, the solution is added to the pure brine fed to the electrolytic cells. In the electrolytic cells the dissolved mercury is then deposited as metallic mercury on the mercury cathode.

This process is notable for its extreme simplicity and is carried out using only auxiliaries such as aqueous sodium hypochlorite, aqueous potassium hypochlorite, chlorous brine or chlorine water, which are usually available anyway in any electrolytic plant or may be readily prepared.

It is equally possible to recover the mercury by subjecting the brine filter sludge obtained from the impoverished brine before it is resaturated or the brine filter sludge obtained from the resaturated brine after treatment with precipitating chemicals to the treatment of the invention.

Depending on the quality of the salt used for resaturating the brine and on the conditions of salt dissolution and salt purification, it is possible that small amounts of impurities such as traces of heavy metal compounds, for example of chromium, molybdenum, vanadium, etc., may pass into the brine filter sludge and then be dissolved when the sludge is treated with chlorous solutions; these impurities progressively accumulate in the brine circulation when added to the pure brine and consequently may interfere with the operation of the electrolytic cells.

In such a case the method described below may be used for separating these impurities from the mercury:

the solution obtained from the brine filter sludge and containing mercuric chloride and traces of the undesirable heavy metal impurities is first treated with excess alkali metal amalgam to convert the mercuric chloride to metallic mercury. The excess alkali metal amalgam is then split in the usual way with the aid of water and an appropriate catalyst into aqueous sodium hydroxide, hydrogen and mercury. If necessary, the mercury is then washed in conventional manner with dilute hydrochloric, sulfuric or nitric acid and thus freed from traces of impurities, whereupon it is recycled to the electrolytic cells.

Alternatively, the mercury may be precipitated as metallic mercury from the solution containing mercuric chloride, for example by cementation with a base metal or by means of known reducing agents.

However, this procedure requires a further purifying step.

The accompanying drawing illustrates diagrammatically one possible way of carrying out the process of the invention on an industrial scale.

Mercury-containing brine filter sludge is continuously fed from tank 1 to stirred tank 3 by conveying means 2. Aqueous sodium or potassium hypochlorite is fed to tank 3 at the required rate from tank 4 via line 5. The resulting slurry is passed through line 6 to rotary filter 7, where the sludge is separated and washed. The washed mercury-free sludge is discharged at 9 and discarded. The filtrate containing mercuric chloride is passed, together with the washings, through line 8 to be collected in tank 10, from which it passes through line 11 to pure brine tank 12, whence it passes through pure brine line 13 back to the electrolytic cell.

If the filtrate containing mercuric chloride contains impurities likely to interfere with the operation of the electrolytic cell, it is passed, together with excess alkali metal amalgam withdrawn from electrolytic cell 22 via line 23, pump 24 and line 25, from tank 10 through line 14 to packed column 15. In this column, the mercuric chloride is reduced to metallic mercury by the alkali metal amalgam and the metallic mercury is absorbed by the amalgam. The mercury-free filtrate is discharged through line 16. The excess amalgam passes over a wier and through line 17 to decomposer 18 packed with graphite lumps, where it is decomposed with water from line 26 to form the components aqueous alkali metal hydroxide, hydrogen and mercury. The aqeuous hydroxide and hydrogen are discharged through line 27. The mercury is then removed from decomposer 18 and either passed directly to electrolytic cell 22 via lines 19 and 21 or, if troublesome impurities are still present, it is passed through lines 19 and 19a into washing tower 20 for purification, from which it is passed through lines 21a and 21 to electrolytic cell 22. The washing liquid is fed to the washing tower through line 28 and withdrawn therefrom through line 29. It may be circulated and renewed at intervals depending on the amount of dissolved impurities and the amount of the traces of aqueous sodium hydroxide entrained with the mercury from tower 18. From the receiver (not shown) of the amalgam pump 24 the recovered mercury continuously flows off through line 30 in the form of alkali metal amalgam and is fed to the other electrolytic cells to meet mercury losses.

The process of the invention enables mercury to be recovered from the brine filter sludge. This reduces the amount of mercury descarded from an electrolytic plant and thus makes an indirect contribution to cleaner effluents.

The process of the invention is described in the following Examples.

EXAMPLE 1

21 kg of moist brine filter sludge containing 0.49% by weight of mercury, based on the solids content, is stirred for 15 minutes with 36 kg of an aqueous sodium hypochlorite solution containing 4.4% of active chlorine. The suspension having a solids content of 600 g/l is passed through a rotary suction filter and the sludge retained by the filter is washed with water. The separated sludge has a solids content of 84% containing 0.006% by weight of mercury. The efficiency of mercury removal is therefore 98.8%.

EXAMPLE 2

17.0 kg of moist brine filter sludge containing 0.62% by weight of mercury in a water-insoluble form is stirred for 10 minutes at room temperature with 39 kg of a solution containing 1.8% of active chlorine dissolved in water. The sludge is passed through a rotary suction filter as in Example 1 and the residue is separated and washed with water. The dried sludge contains only 0.012% by weight of mercury, equivalent to a mercury removal of 98.1%.

EXAMPLE 3

0.1 l of the filtrate obtained in Example 1 or 2 and containing about 0.5% by weight of dissolved mercury is shaken in a separating funnel with 130 g of sodium amalgam (containing 0.194% of sodium) for 15 seconds. The amalgam is then discharged. Mercury is no longer detectable in the aqueous solution.

We claim:

1. In a process for the recovery of mercury from the brine filter sludge obtained from a plant for the electrolysis of alkali metal chloride by the amalgam process, by dissolving the mercury contained in the brine filter sludge in a water-insoluble form, the improvement which comprises treating the brine filter sludge with a solution containing active chloride, filtering off the undissolved portion of the brine filter sludge, washing, combining the filtrate and washings, and precipitating the mercury from the resulting mercuric solution.

2. A process as in claim 1, wherein the treatment of the brine filter sludge is carried out using aqueous alkali metal hypochlorite, chlorous brine or chlorine water.

3. A process as set forth in claim 1 wherein the mercuric solution is added to the pure brine fed to the electrolytic cells.

4. A process for the recovery of mercury from the brine filter sludge obtained from a plant for the electrolysis of alkali metal chloride by the amalgam process which comprises:

dissolving the mercury contained in the brine filter sludge in a water-insoluble form, treating the brine filter sludge with a solution containing active chlorine, filtering off the undissolved portion of the brine filter sludge, washing, combining the filtrate and washings, and precipitating the mercury from the resulting mercuric solution by treatment with excess alkali metal amalgam.

5. A process as set forth in claim 4 wherein the amalgam remaining after the treatment of the mercuric solution is converted to aqueous alkali metal hydroxide, hydrogen and mercury, and the latter is fed to an alkali-chlorine electrolytic cell.

6. A process as set forth claim 5, wherein the mercury, before it is fed to an alkali chlorine electrolytic cell, is freed from impurities by washing with a dilute acid in a washing tower.

* * * * *